US006853995B2

(12) United States Patent
Matsuzaki et al.

(10) Patent No.: US 6,853,995 B2
(45) Date of Patent: Feb. 8, 2005

(54) INFORMATION RETRIEVAL/DISTRIBUTION SYSTEM, COMPUTER READABLE STORAGE MEDIUM, AND PROGRAM FOR INFORMATION RETRIEVAL/DISTRIBUTION

(75) Inventors: Yoshiaki Matsuzaki, Kawasaki (JP); Hiroyuki Uesaka, Toyama (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 09/921,943

(22) Filed: Aug. 6, 2001

(65) Prior Publication Data

US 2002/0029225 A1 Mar. 7, 2002

(30) Foreign Application Priority Data

Feb. 8, 2001 (JP) ........................................ 2001-032761

(51) Int. Cl.[7] ............................................. G06F 17/30
(52) U.S. Cl. .................................... 707/10; 707/104.1
(58) Field of Search ............................... 707/2, 3, 5, 6, 707/10, 104.1; 705/27; 709/201, 202

(56) References Cited

U.S. PATENT DOCUMENTS

| | | | | |
|---|---|---|---|---|
| 6,026,429 A | * | 2/2000 | Jones et al. ................. | 709/201 |
| 6,381,599 B1 | * | 4/2002 | Jones et al. ................. | 707/5 |
| 6,640,223 B1 | * | 10/2003 | Jones et al. ................. | 707/3 |
| 6,647,383 B1 | * | 11/2003 | August et al. ................ | 707/3 |

* cited by examiner

Primary Examiner—Diane D. Mizrahi
Assistant Examiner—Apu Mofiz
(74) Attorney, Agent, or Firm—Staas & Halsey LLP

(57) ABSTRACT

An information retrieval/distribution system configured on computers and for requesting the retrieval of information which is scattered on a network, comprises an information retrieval request unit for requesting the retrieval of information and a plurality of database management units for managing databases. Each of the plurality of database management units (e.g., each manager) has management information about the databases which are managed by each manager, and has management information about the databases which are managed by other database management units which can be connected to each manager through said network. When a retrieval criterion is input to the information retrieval request unit, one of the plurality of database management units (e.g., one manager), based on the management information in one manager, retrieves the information in the databases managed by one manager, and requests any other database management unit (e.g., other manager) managing the database in which the information related to said retrieval criterion is stored to retrieve the information in the databases managed by other manager, thereby distributing the information corresponding to the retrieval criterion to the information retrieval request source.

18 Claims, 11 Drawing Sheets

Fig.5

FIRST RECORD (OWN INFORMATION)

| MANAGER NAME (OWN) | IP ADDRESS (OWN) | DB CATEGORY NAME | RENEWAL DATE |
|---|---|---|---|
| | | | |
| | | | |
| | | | |
| | | | |
| | | | |

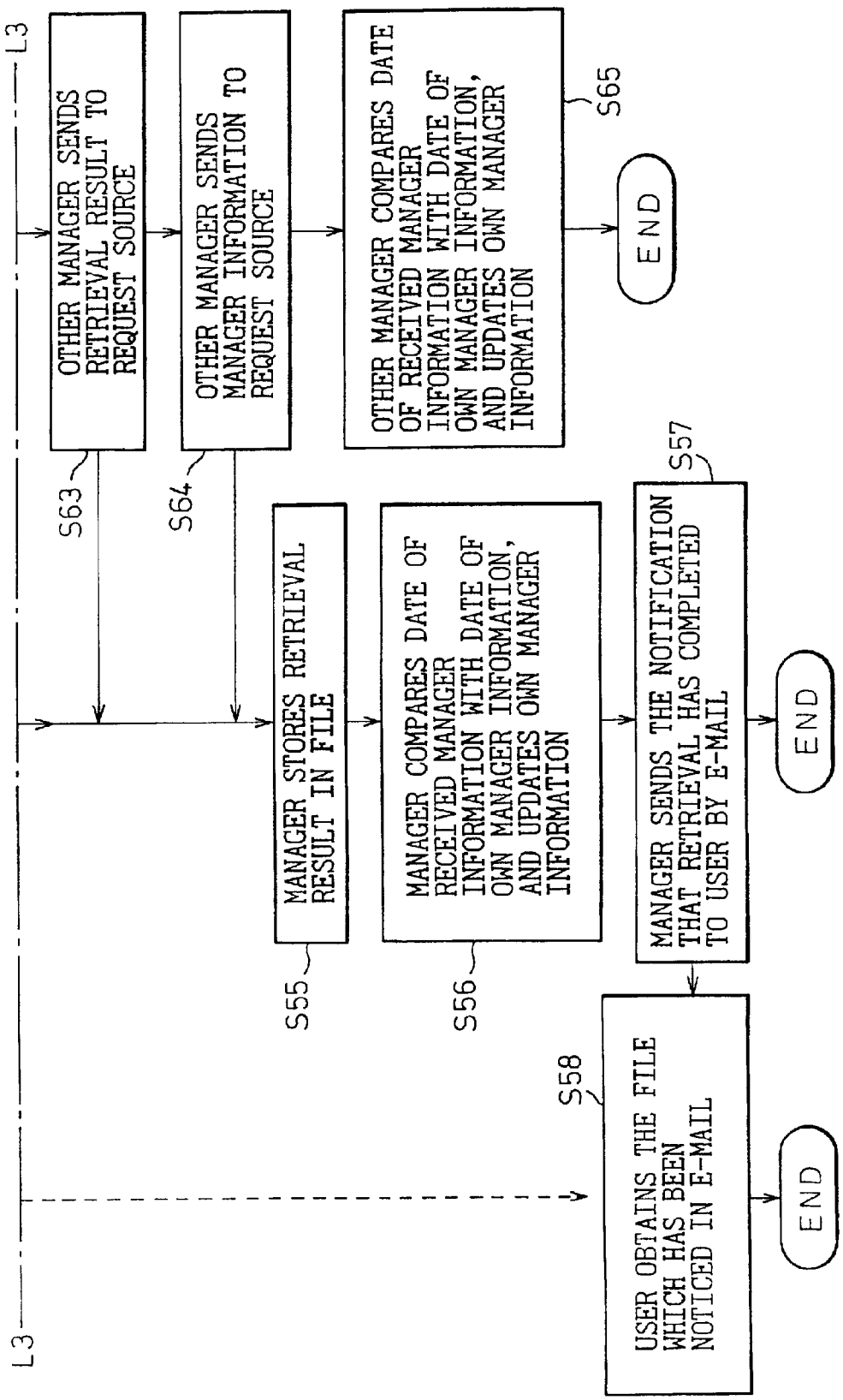

INFORMATION RETRIEVAL/DISTRIBUTION SYSTEM, COMPUTER READABLE STORAGE MEDIUM, AND PROGRAM FOR INFORMATION RETRIEVAL/DISTRIBUTION

BACKGROUND OF THE INVENTION

1. Field of the Invention

The present invention relates to an information retrieval/distribution system, a computer readable storage medium, and a program for information retrieval/distribution, which are configured on computers such as personal computers and used for retrieving various kinds of information such as fact data which are scattered on a network such as the Internet and for distributing the information to users, etc.

2. Description of the Related Art

In general, in research or development workplaces, several kinds of information, for example, fact data such as waveform data from seismometers and genetic information, which have been collected through researcher's experiment, etc., are stored in respective databases and are used by other experts.

In recent years, we have had much opportunity, because of the widespread use of the Internet, in which the data stored in databases are retrieved by users and distributed to the users through the Internet. Users empirically know the location of a database necessary for themselves, and conventionally obtain the necessary data (information) by sending e-mail to the database administrator of the database, or receiving a data distribution service on the basis of the URL (Uniform Resource Locator) indicating the address of the database, etc.

In more detail, the conventional information retrieval/distribution system for obtaining necessary data through the Internet is usually configured so that personal computers possessed by users, database servers for providing a plurality of databases, and personal computers for database servers for giving several kinds of instructions to the database servers, are connected to the Internet In this information retrieval/distribution system, users, as information retrieval request sources, know empirically the location of the database having the data necessary, and request the personal computers for the database servers through the user's personal computers to offer the database to the users. The user then allows a browser to display the data in the database which has been offered from the personal computer for the database servers, on the input screen of the user's personal computer, and retrieves the necessary data. When the necessary data is in the database, the user obtains the data through the personal computer for the database servers.

However, there is a problem, in the conventional information retrieval/distribution system described above, in that it is difficult for users to know the location of every database, through the Internet, in which the necessary data are stored, because these data can be scattered all over the world, in many cases. We have another problem in that it is also difficult for experts to use these data, because the formats of these data are not unified, in many cases.

Furthermore, although the data in the field of expertise can be obtained through an institute, etc., it is even difficult to know whether the data exists or not when retrieving the data outside the field of expertise, Even if a typical information retrieval tool, such as a search engine, on the Internet is used, a number of sites on the Internet have to be searched, which puts a large burden to the users.

On the other hand, it is also difficult to know the ever-increasing locations of databases (database sites) on the Internet. For this reason, locations of databases are often disclosed through e-mail or homepages at present, and hence users always have to monitor the information about the database sites necessary for the users.

SUMMARY OF THE PRESENT INVENTION

It is therefore an object of the present invention to provide an information retrieval/distribution system, a computer readable storage medium, or a program for information retrieval/distribution, by which users can retrieve and collect data, on a network such as the Internet, to use the necessary data efficiently even if the users do not know the locations of the data on the network or the formats of the data are not unified.

In order to achieve the above object, a information retrieval/distribution system according to the present invention comprises an information retrieval request unit for requesting the retrieval of several kinds of information which are scattered on a network; and a plurality of database management units (e.g., managers) for managing databases in which said several kinds of information are stored. Each of said plurality of database management units (e.g., each manager) has management information (e.g., manager information) about the databases which are managed by said each manager, and has management information about the data bases which are managed by other database management units which can be connected to said each manager through said network.

In such a system configuration, when a retrieval criterion is input to said information retrieval request unit, one of said plurality of database management units (e.g., one manager), based on said management information in said one manager, retrieves the information in the databases managed by said one manager, and requests any other database management unit (e.g., other manager) managing the database in which the information related to said retrieval criterion is stored to retrieve the information in the database managed by said other manager, thereby distributing the information corresponding to said retrieval criterion to the information retrieval request source.

Preferably, said one manager manages a plurality of databases and can register the kinds of said plurality of databases as management information, and when the information retrieval is requested by said information retrieval request source, said one manager retrieves said plurality of databases to collect the required information, and then changes the data format of the collected information to a unified format and distributes the collected information to said information retrieval request source.

Furthermore, preferably, said one manager has the function of requesting said other manager to retrieve the information in the databases managed by said other manager followed by receiving the result of the retrieval of said information from said other manager to distribute said result to said information retrieval request source.

Furthermore, preferably, said one manager has the functions of including the list of the management information possessed by said other manager in the management information of said one manager; comparing the management information of the database management unit which has been newly requested to retrieve the required information by said one manager with the management information of said one manager to obtain the difference between said both management information; and updating the management information of said one manager, based on said difference, or said one manager has the function of communicating with said other manager periodically and exchanging the management information with said other manager to update the management information of said one manager.

Furthermore, preferably, said one manager has the functions of making category information which defines the categories of the databases managed by said one manager; and designating a database management unit managing the database in the same category to exchange the information with said database management unit, based on said category information.

Furthermore, preferably, said one manager has the functions of designating retrieving items of the information in the databases managed by said one manager through the retrieving screen of said information retrieval request unit; and requesting said other manager to retrieve the information in the databases managed by said other manager.

Furthermore, preferably, said one manager has the function of automatically requesting said other manager managing the database in which the information related to said retrieval criterion is stored, to retrieve said information, in the case in which said one manager does not designate any retrieving item through the retrieving screen of said information retrieval request unit.

Furthermore, preferably, said one manager has the functions of designating a category through the retrieving screen of said information retrieval request unit; and connecting said one manager automatically to said other manager managing the database in said category to select said database in said category.

Furthermore, preferably, said one manager has the functions of registering the retrieval information of said information retrieval request source; executing the same retrieval periodically, based on said retrieval information; and sending the result of the retrieval to said information retrieval request source.

In addition, an information retrieval/distribution system according to the present invention may be accomplished by using a computer readable storage medium that stores a means which retrieves the information in the database managed by one of database management units (one manager), based on the management information in said one manager, when a retrieval criterion is input to an information retrieval request unit for requesting the retrieval of several kinds of information which are scattered on a network; and a means which requests another database management unit (other manager) which is able to be connected to said one manager, through said network, to retrieve the information in the database in which the information related to said retrieval criterion is stored and which is managed by said other manager, based on the management information about the database managed by said other manager.

Furthermore, an information retrieval/distribution system according to the present invention may be accomplished by using a program for information retrieval/distribution allowing a computer, in order to retrieve information and distribute said information to the information retrieval request source, to operate as a means which retrieves the information in the databases managed by one of database management units (one manager), based on the management information in said one manager, when a retrieval criterion is input to an information retrieval request unit for requesting the retrieval of several kinds of information which are scattered on a network; and a means which requests another database management unit (other manager) which is able to be connected to said one manager, through said network, to retrieve the information in the database in which the information related to said retrieval criterion is stored and which is managed by said other manager, based on the management information about the database which is managed by said other manager.

In summary, in the present invention, database management units such as an information retrieval request unit and managers having user interface function are provided on the Internet, and each of the database management units (each manager) has management information about databases managed by said each manager and management information about the databases managed by other database management units in remote sites which can be connected to said each manager through the Internet. Therefore, a user may only request a database management unit to retrieve the database necessary for the user through the retrieving screen of the information retrieval request unit, so that said database management unit requests any other database management unit in a remote site which manages a necessary database, based on the management information mentioned above, to retrieve the required information, and collects the required information, and then distributes the necessary information to the user. For this reason, it is not necessary for the user to check on information about the location of the data every time the user wants to get the data, and thereby the user can get necessary data efficiently.

In addition, in the present invention, since the database management unit has the function of converting information from the database into the information in a unified data format, it is not necessary for the user to convert the format of the distributed data every time the user gets it, and thereby the user can use necessary data easily.

BRIEF DESCRIPTION OF THE DRAWINGS

The above object and features of the present invention will be more apparent from the following description of preferred embodiments with reference to the accompanying drawings, wherein:

FIG. 5 shows a data format depicting an example of manager information used in the embodiments of the present invention;

FIG. 11 is a flow chart (2) depicting the procedure of a periodical information retrieval in the embodiments of the present invention.

DESCRIPTION OF THE PREFERRED EMBODIMENTS

Figure 1:
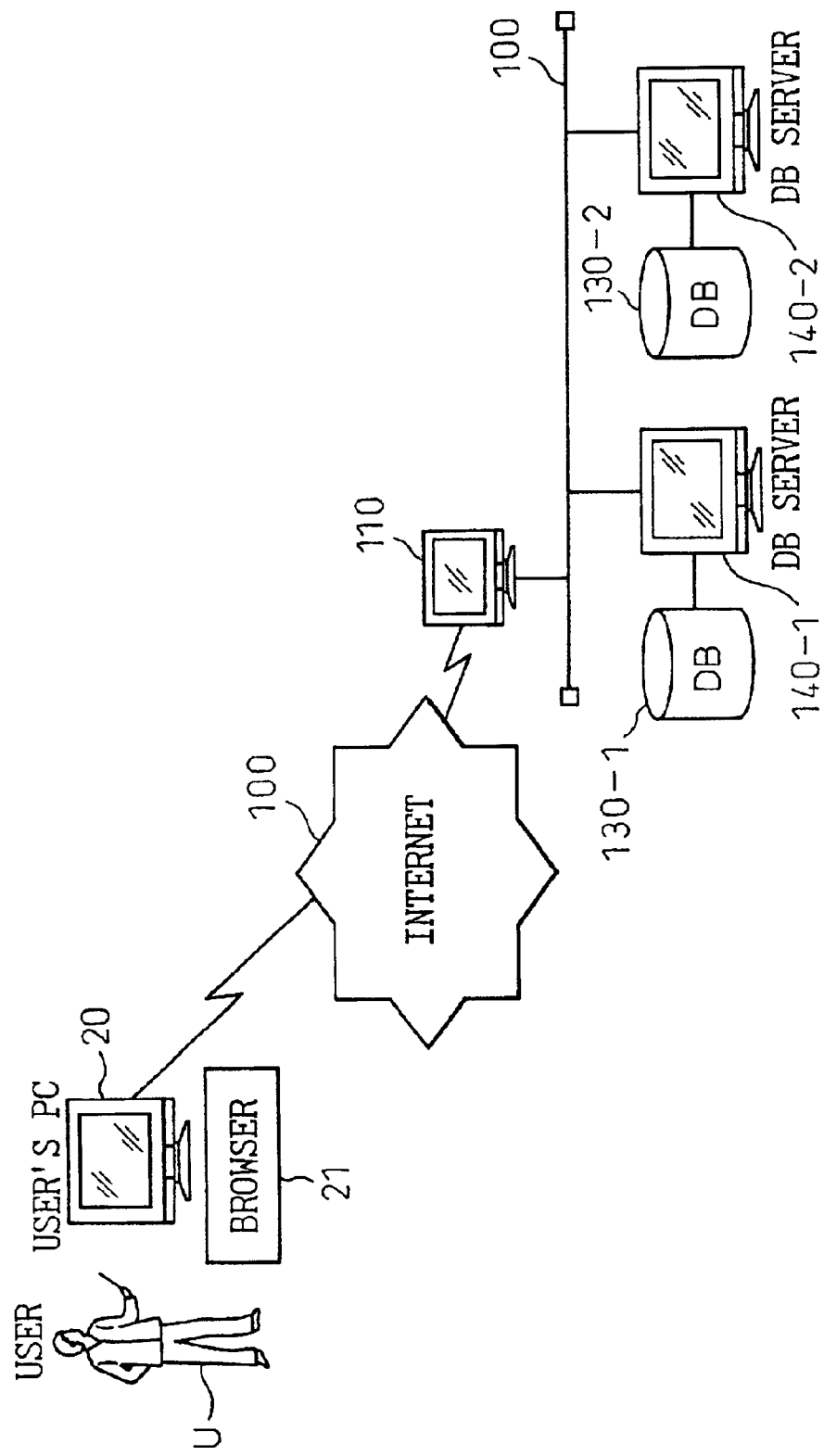
FIG. 1 shows the configuration of a conventional information retrieval/distribution system.

Before the preferred embodiments of the present invention are described, conventional arts and problems thereof are described briefly with reference to the reference figure (FIG. 1).

FIG. 1 shows the configuration of a conventional information retrieval/distribution system. In FIG. 1, a simplified configuration of the information retrieval/distribution system using the Internet 100 is shown.

In the information retrieval/distribution system shown in FIG. 1, a user's personal computer (shown as USER'S PC in FIG. 1) 20 which is owned by a user U, database servers (shown as DB SERVER in FIG. 1) 140-1 and 140-2 which provide databases (shown as DB in FIG. 1) 130-1 and 130-2, respectively, and a personal computer for database servers (personal computer for DB servers) 110 which gives various kinds of instructions to the database servers 140-1 and 140-2 are connected to the Internet 100.

In the information retrieval/distribution system configured as shown in FIG. 1, the user U, an information retrieval request source, knows empirically the location of the database (e.g., database 130-1) having the data necessary for the user, and requests the personal computer for the database server 110 through the user's personal computer 20 to offer the database 130-1 to the user U. The user U then allows software of a browser 21 to display the data in the database which has been offered from the personal computer for the database server 110, on the input screen of the user's personal computer 20, and retrieves the necessary data. When the necessary data is in the databases, the user U obtains the data through the personal computer for the database server 110.

However, as aforementioned, there is a problem, in the conventional information retrieval/distribution system as shown in FIG. 1, in that it is difficult for the user U to know the location of every database, through the Internet, in which the data necessary for the user U are stored, because these data can be scattered all over the world, in many cases. There is another problem in that it is also difficult for experts to use these data, because the formats of these data are not unified, in many cases.

Next, the configuration and operation of the preferred embodiments of the present invention which has been contrived to solve the above problems are described below with reference to the accompanying drawings (FIG. 2 to FIG. 11). Described below are the specific configuration and information retrieval procedure of the information retrieval/distribution system having a plurality of information retrieval/distribution apparatuses which are connected to the Internet and can refer to each other.

Figure 2:
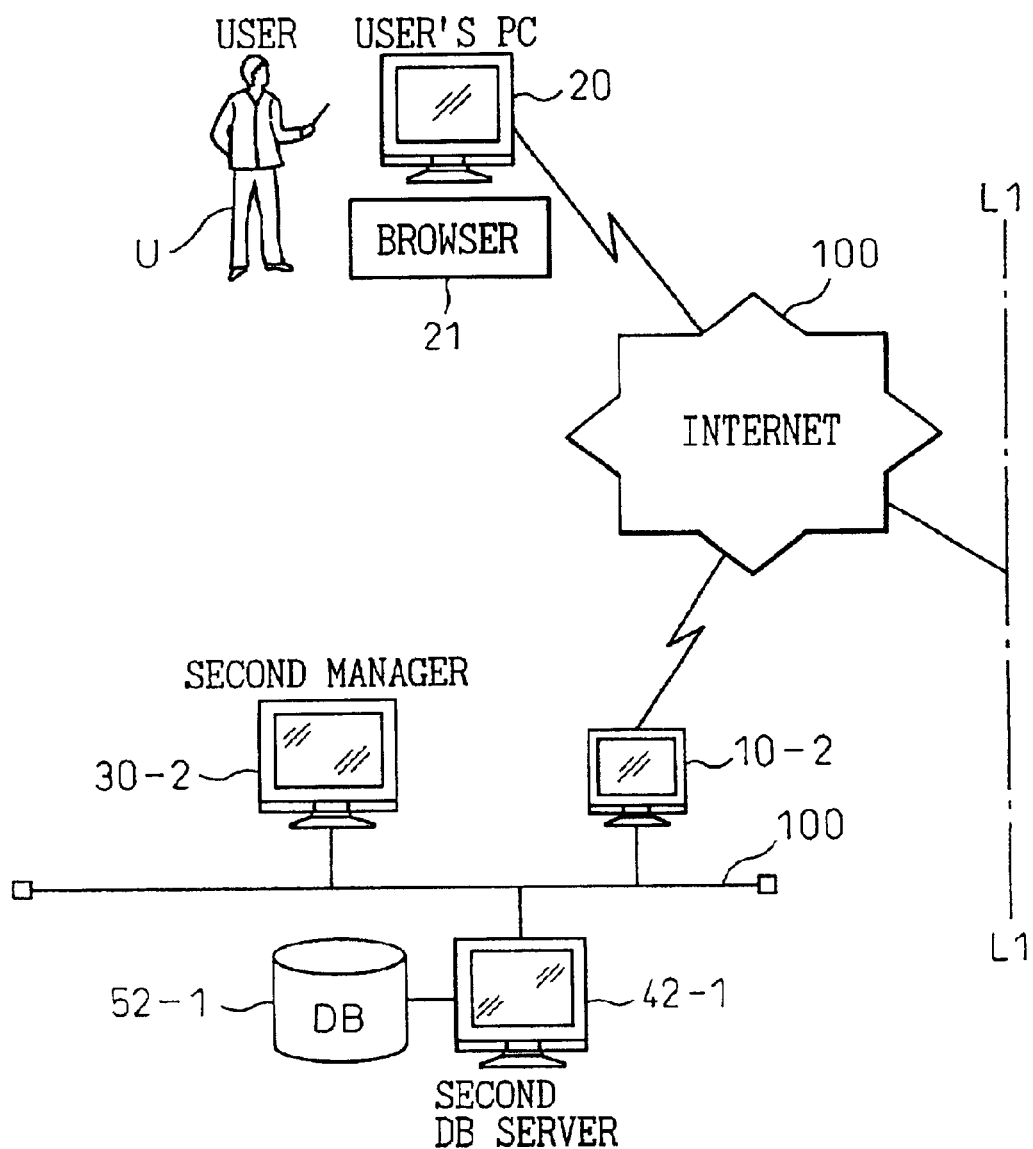
FIG. 2 is a block diagram (1) showing the configuration of an embodiment of an information retrieval/distribution system according to the present invention.
Figure 3:
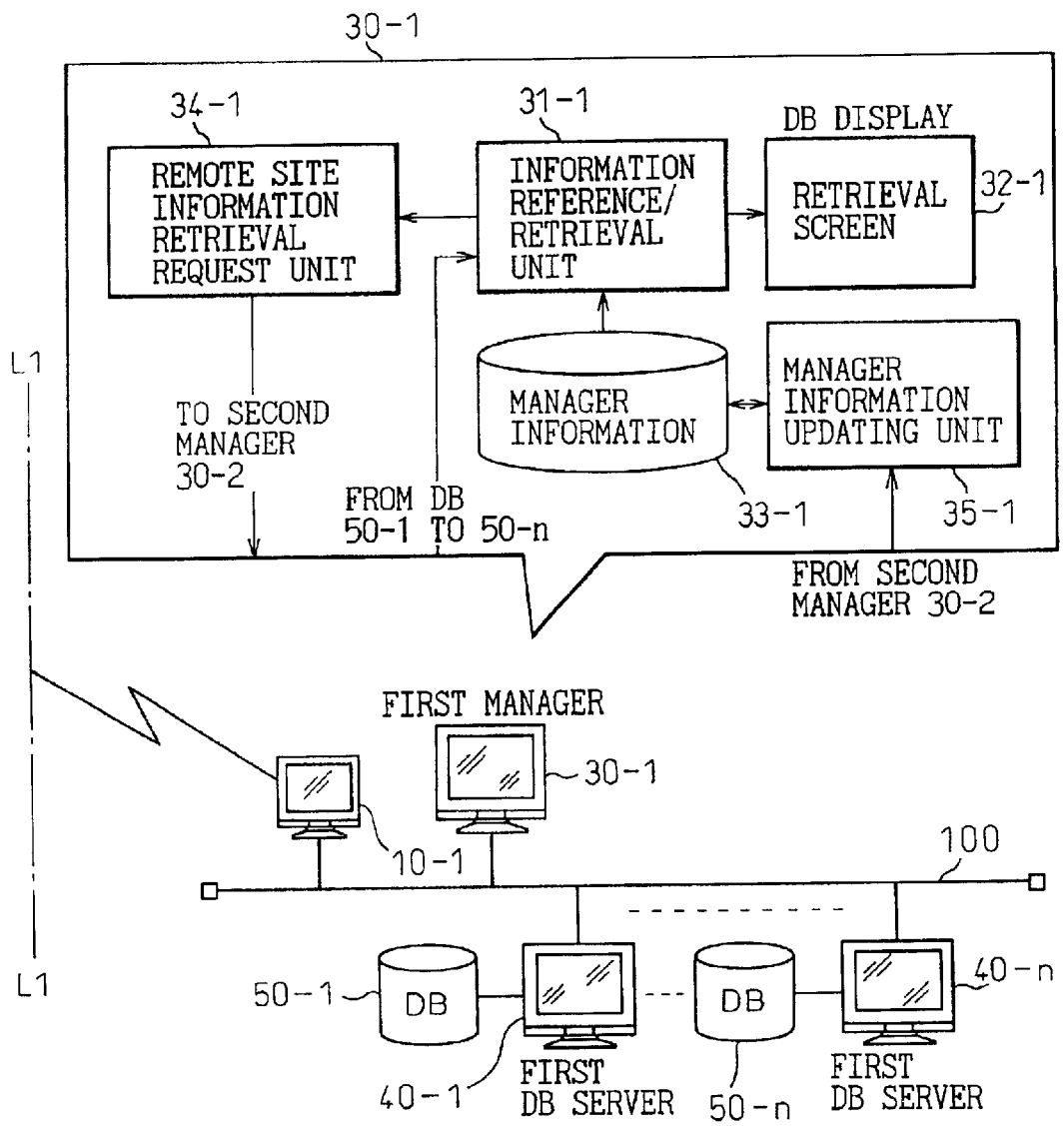
FIG. 3 is a block diagram (2) showing the configuration of an embodiment of the information retrieval/distribution system according to the present invention.

FIG. 2 and FIG. 3 are block diagrams (1) and (2) respectively showing the configuration of an embodiment of the information/distribution system according to the present invention. Hereinafter, any component similar to an aforementioned component is indicated with the same reference numeral.

In the information retrieval/distribution system shown in FIG. 2 and FIG. 3, a first manager 30-1 and a second manager 30-2 are connected through the Internet. These managers correspond to the plurality of database management units in the present invention. The first manager 30-1, a plurality of first database servers (shown as FIRST DB SERVER in the figures) 40-1 to 40-n (n is a positive integer equal to 2 or more than 2) which are connected to the first manager 30-1, and a personal computer for the first manager (PC for the first manager) 10-1 which controls the operation of the first manager 30-1, comprise a first information retrieval/distribution apparatus on the Internet 10. In the first information retrieval/distribution apparatus, a plurality of databases 50-1 to 50-n in which several kinds of data are stored are connected to the plurality of first database servers 40-1 to 40-n, respectively. The data in these databases are offered according to the instruction of the first manager 30-1. Likewise, the second manager 30-2, the second database server (shown as SECOND DB SERVER in FIG. 2) 42-1 which is connected to the second manager 30-2, and a personal computer for the second manager (PC for the second manager) 10-2 which controls the operation of the second manager 30-2, comprise a second information retrieval/distribution apparatus on the Internet 10. In the second information retrieval/distribution apparatus, a database 52-1 in which several kinds of data are stored is connected to the second database server 42-1. The data in the database 52-1 are offered according to the instruction of the second manager 30-2. The first and second information retrieval/distribution apparatuses can refer to the data stored in the database connected to another one through the first manager 30-1 and second manager 30-2, respectively.

Furthermore, in the information retrieval/distribution system shown in FIG. 2 and FIG. 3, a user's personal computer (shown as USER'S PC in the figures) 20 owned by a user U, an information retrieval request source, is connected to the first and second information retrieval/distribution apparatuses through the Internet 100. The data stored in the databases of the first and second information retrieval/distribution apparatuses are displayed on the input screen of the user's personal computer 20 via software of the browser 21, and are retrieved by means of the input operation buttons, keyboard, etc.

In more detail, the first manager 30-1 of the first information retrieval/distribution apparatus is provided with a retrieval screen 32-1 which functions as the information retrieval request unit used in the present invention. The retrieval screen 32-1 is referred to, using the browser 21, through the user's personal computer 20, and the data in the plurality of databases are displayed on the retrieval screen 32-1. The first manager 30-1 is further provided with an information reference/retrieval unit 31-1 which is in the first manager 30-1, a manager information 33-1 which functions as management information which is referred to by the information reference/retrieval unit 31-1, a manager information updating unit 35-1 which updates the manager information 33-1, and a remote site information retrieval request unit 34-1 which request a remote site manager (e.g., the second manager 30-2) to retrieve the related data.

The manager information 33-1 includes the manager information about the database 52-1 managed by a remote site manager (e.g., the second manager 30-2) which can be connected to the first manager 30-1 through the Internet, in addition to the manager information about the databases 50-1 to 50-n managed by the first manager 30-1.

In the information retrieval/distribution system shown in FIG. 2 and FIG. 3, when the user U requests the retrieval of data necessary for the user U through the retrieval screen 32-1, the information reference/retrieval unit 31-1 in the first manager 30-1 refers to the manager information 33-1 and retrieves the data in the databases 50-1 to 50-n managed by the first manager 30-1. If the information reference/retrieval unit 31-1 has not obtained the required data as the result of the retrieval, the information reference/retrieval unit 31-1 requests the remote second manager 30-2 managing the database (e.g., the database 52-1) in which the related data is stored, to retrieve the database 52-1 managed by the second manager 30-2. Thus, even if the user does not know whether or not the database managed by the second manager in a remote site exists, the user can use necessary data efficiently by retrieving and collecting the information in the database at the remote site. The information reference/ retrieval unit 31-1, the remote site information retrieval request unit 34-1, and the manager information updating unit 35-1 in the first manager are preferably implemented via software of the computer.

In the case in which an embodiment of the information retrieval/distribution system according to the present invention is implemented by using a computer readable storage medium, such as a hard disk and a magneto-optical disk, it is preferred to provide a computer readable storage medium that stores a means (e.g., the information reference/retrieval unit 31-1) which retrieves the data in the database managed by the first manager, based on the management information in the first manager, when a retrieval criterion is input to an information retrieval request unit for requesting the retrieval of several kinds of information which are scattered on a network; and a means (e.g., the remote site information retrieval request unit 34-1) which requests a remote manager (e.g., the second manager) which is able to be connected to the first manager through the Internet, to retrieve the information in the database in which the information related to said retrieval criterion is stored and which is managed by the second manager, based on the management information about the database managed by the second manager.

It is also preferred to provide a program for information retrieval/distribution allowing a computer, in order to retrieve information and distribute said information to the information retrieval request source, to operate as a means which retrieves the information in the database managed by one of database management units (one manager) (e.g., the first manager), based on the management information (e.g., the manager information) in said one manager, when a retrieval criterion is input to the information retrieval request unit for requesting the retrieval of several kinds of information which are scattered on a network such as the Internet; and a means which requests another database management unit (other manager) (e.g., the second manager) which can be connected to said one manager, through the network, to retrieve the information in the database in which the information related to said retrieval criterion is stored and which is managed by said other manager, based on the management information about the database which is managed by said other manager.

Figure 4:
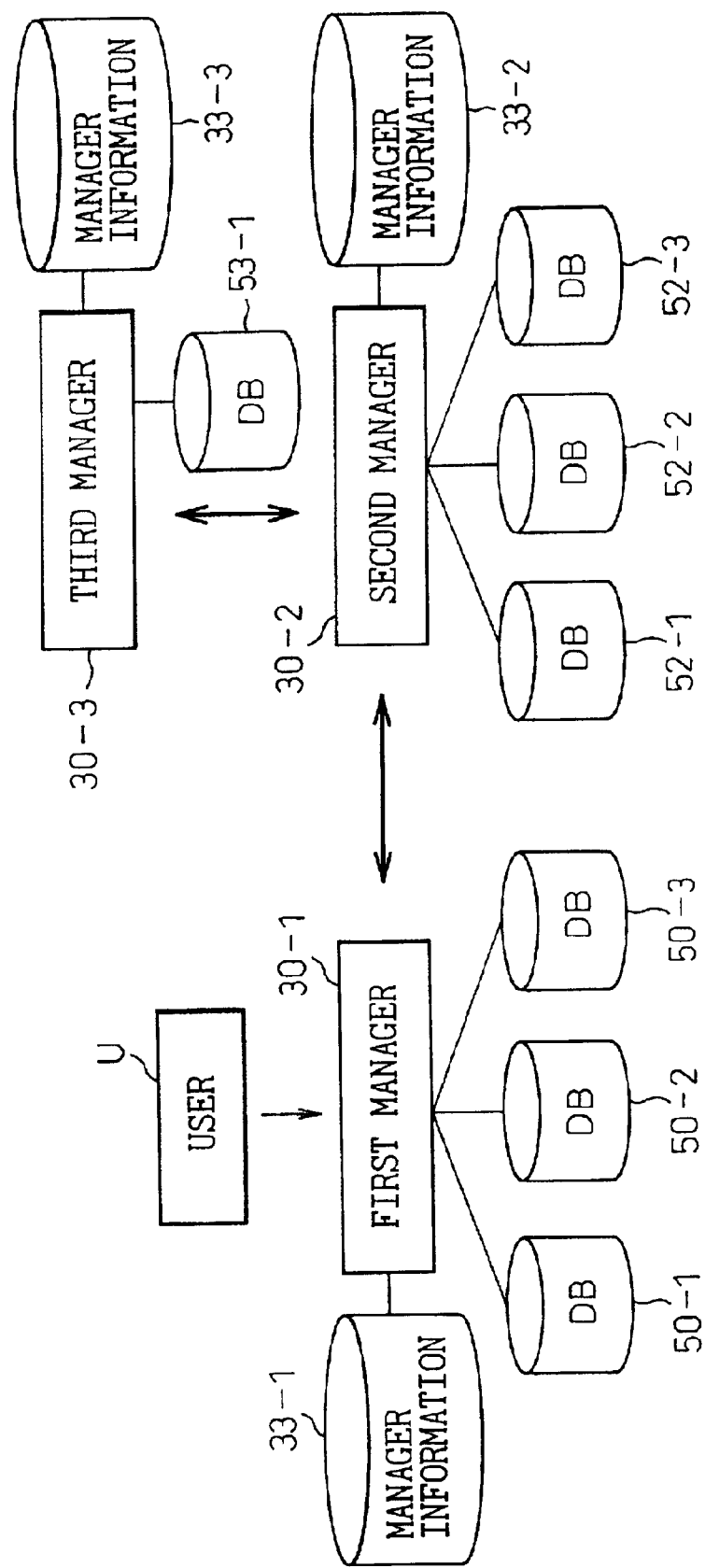
FIG. 4 is a block diagram showing the flow of the information retrieval procedure in another embodiment of the present invention.

In addition, it is also preferred that the manager information updating unit 35-1 in the first manager 30-1 has the functions of including the list of the manager information possessed by other managers in the management information of the first manager 30-1; comparing the manager information of the second manager which has been newly requested to retrieve the required information by the first manager with the manager information of the first manager to obtain the difference between said both manager information; and updating the manager information of the first manager, based on said difference; or the function of communicating with the second manager periodically and exchanging the manager information with the second manager to update the manager information of the first manager. In this invention, it is preferred to provide a storage medium in which a means for implementing the above functions is stored FIG. 4 is a block diagram showing the flow of the information retrieval procedure in another embodiment of the present invention. In this figure, the configuration of the information retrieval/distribution system is simplified more than the aforementioned embodiment shown in FIG. 2 and FIG. 3.

The configuration of the embodiment shown in FIG. 4 is substantially the same as the configuration of the embodiment shown in FIG. 2 and FIG. 3, except that the second manager 30-2 of the second information retrieval/ distribution apparatus manages the plurality of databases 52-1 to 52-3 and that the third information retrieval/ distribution apparatus is connected to the Internet, in addition to the first and second information retrieval/distribution apparatuses.

As shown in FIG. 4, the third information retrieval/ distribution apparatus comprises, like the aforementioned first and second information retrieval/distribution apparatuses, a third manager 30-3, a third database server (not shown in FIG. 4) which is connected to the third manager 30-3, and a personal computer for the third manager (not shown in FIG. 4) which controls the operation of the third manager 30-3. The third manager 30-3 manages a database 53-1.

In the information retrieval/distribution system in FIG. 4, when retrieving the data necessary for the user U, the user U at first connects the user's personal computer to the first manager 30-1 through the Internet, and then puts the retrieval screen 32-1 (shown in FIG. 3) in display on the input screen of the user's personal computer using the browser 21 (shown in FIG. 2). Next, the user U inputs a retrieval criterion to the retrieval screen 32-1 by means of the input operation button, etc. to allow the first manager 30-1 to retrieve the necessary data. The first manager 30-1 refers to the manager information 33-1. When the first manager 30-1 has recognized that the required data exists in the databases 50-1 to 50-3 managed by the first manager 30-1, the first manager 30-1 retrieves the required data. When the first manager 30-1 has obtained the required data as the result of the retrieval, the first manager 30-1 converts the required data into an appropriate data format and then sends the data to the user U. When the first manager 30-1 has not obtained the required data, the first manager 30-1 refers to the manager information 33-1 and then selects the second manager 30-2 managing the database in which the data in the same category as the required data is stored, from the managers which can be connected to the first manager 30-1, and requests the second manager 30-2 to retrieve the required data, through the Internet. The second manager 30-2 which has been requested to retrieve the required data retrieves the data in the databases 52-1 to 52-3 managed by itself. When the second manager 30-2 has obtained the required data, the second manager 30-2 converts the required data into an appropriate data format, and then send the data to the first manager.

When the first manager 30-1 requests the second manager 30-2 to retrieve the data, the first manager 30-1 sends the latest renewal date of the manager information 33-1 of the first manager 30-1. If the manager information 33-2 of the second manager 30-2 is newer than the manager information 33-1 of the first manager 30-1, the second manager 30-2 sends its manager information 33-2 to the first manager 30-1.

For example, in the information retrieval/distribution system in FIG. 4, the second manager 30-2 has the manager information 33-3 of the third manager 30-3, but the first manager 30-1 does not have the manager information 33-3 of the third manager 30-3. In this case, the first manager 30-1 learns the existence of the third manager 30-3 from the manager information 33-2 which has been sent by the second manager 30-2.

As described above, the user may only connect the user's personal computer to a manager (e.g., the first manager) known by the user so that the user also retrieve the information in the database managed by any other manager (e.g., the third manager). However, the user may intentionally request only any other manager (e.g., the third manager) to retrieve the data by designating it through the retrieval screen. For this reason, the user may retrieve the database managed by a manger (e.g., the second manager) at a remote site by using a retrieval screen, which the user is accustomed to use, of a manager (e.g., the second manager) to which the user's personal computer is usually connected.

Furthermore, the first manager, which is usually used by the user, has the functions of making category information which defines the categories of the databases managed by the first manager; and designating a manager managing the database in the same category to exchange the information with said manager based on said category information. In this case, when the user does not particularly designate any manager to be connected to the first manager, the first manager retrieves its manager information and automatically selects a single manager or a plurality of managers managing the database in the same category as that which has been designated by the first manager, and then requests the manager which has been selected to retrieve the data.

The user may register the user's original retrieval method, retrieval frequency, etc. as retrieval criteria in the first manager which the user always use. The first manager thereby may retrieve the data by the designated method at the designated time. The result of such data retrieval is sent to the user, the information retrieval request source, by e-mail, etc., and thereby the user may obtain the result of the data retrieval periodically.

FIG. 5 shows a data format depicting an example of manager information used in the embodiments of the present invention.

In the manager information shown in FIG. 5, the information about the manager which has this manager information are stored in the first record. In the records other than the first record, the information of other managers which can be connected to this manager are stored. The information to be stored are manager names, IP (Internet Protocol) addresses of the information retrieval/distribution apparatuses in which a manager is active, academic category names of the databases to be retrieved, the latest renewal dates of the manager information corresponding to the manager names, etc.

Figure 6:
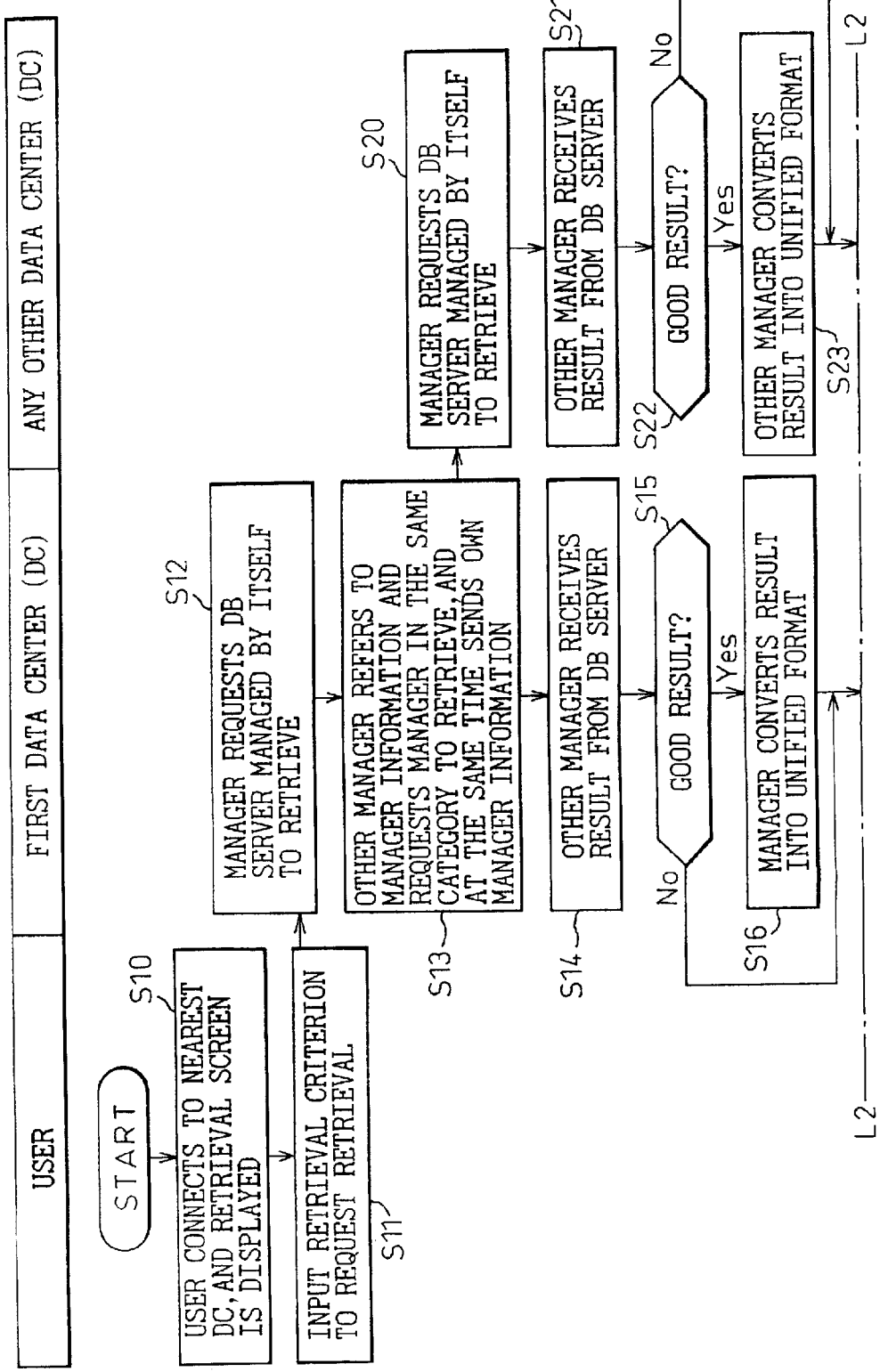
FIG. 6 is a flow chart (1) depicting the procedure of a typical information retrieval in the embodiments of the present invention.
Figure 7:
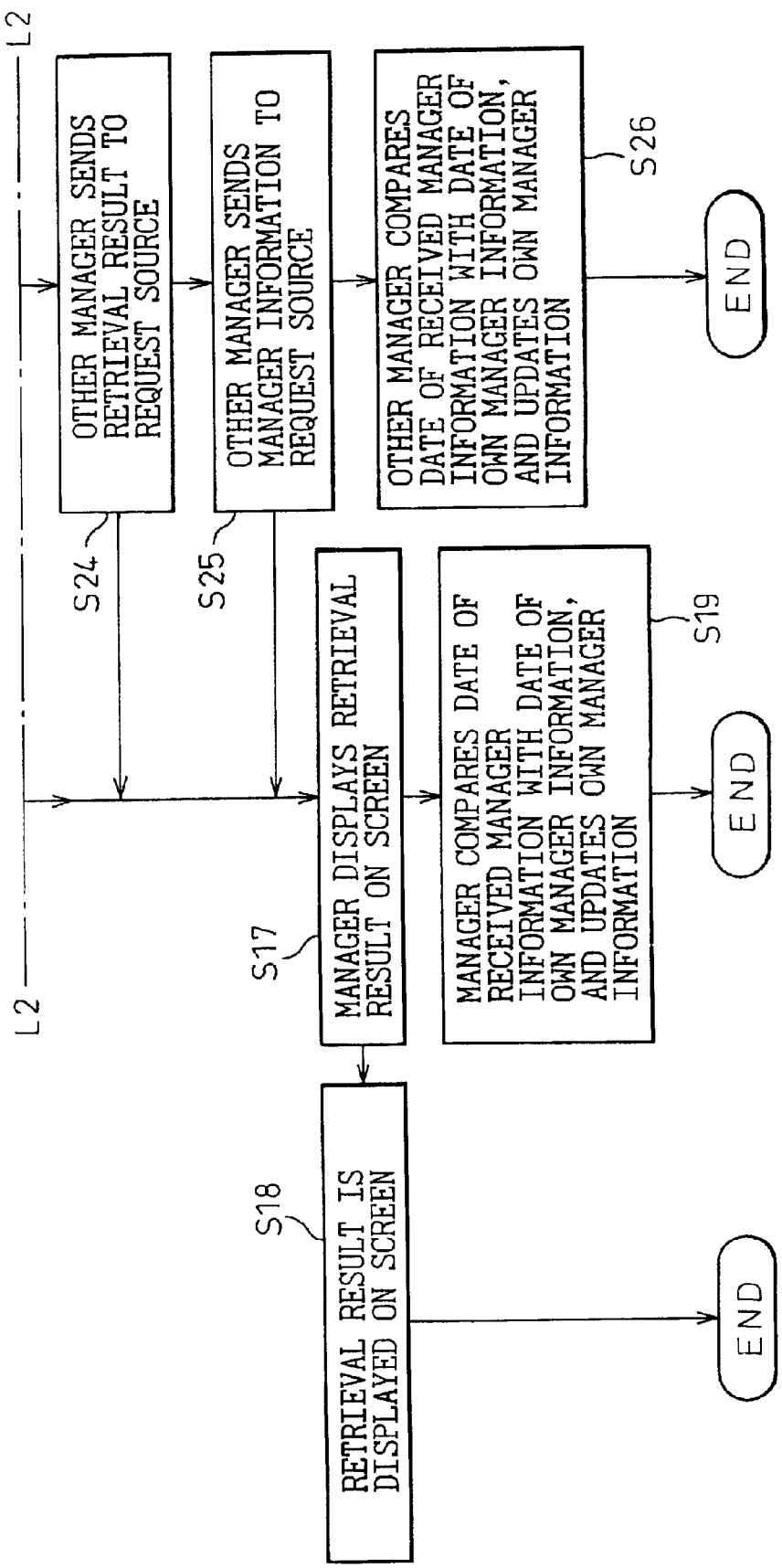
FIG. 7 is a flow chart (2) depicting the procedure of the typical information retrieval in the embodiments of the present invention.

FIG. 6 and FIG. 7 are flow charts (1) and (2) respectively depicting the procedure of a typical information retrieval in the embodiments of the present invention. In these flow charts, shown is the process flow of the ordinal data retrieval executed by the information retrieval/distribution system which comprises a first information retrieval/distribution apparatus consisting of a first data center (DC), and other information retrieval/distribution apparatuses each consisting of any other data center (DC).

As shown in the flow chart in FIG. 6, a user, who is a information retrieval request source, at first connects a user's personal computer to the nearest data center (e.g., the first data center), and then allows the user's personal computer to display the retrieval screen (step S10). Next, the user inputs a retrieval criterion, such as the user's original retrieval method, retrieval frequency and the like, into the retrieval screen to request the retrieval of the data necessary for the user (step S11).

The manager in the first data center requests the database servers managed by itself to retrieve the required data (step S12). In addition, the manager in the first data center refers to the manager information stored in itself, and requests any other manager (other manager) in any other data center (other data center) which manages the databases in which the data in the same category as the required data is stored, to retrieve the required data, and at the same time sends the manager information stored in itself to said other manager (step 13). Further, the manager in the first data center receives the result of the retrieval from a database server managed by itself (step S14). When the manager in the first data center has received a good result of the retrieval (required data) (step S15), the manager converts the required data into an appropriate unified data format (step S16).

On the other hand, said other manager in said other data center requests the database servers managed by itself to retrieve the necessary data according to the request of data retrieval from the manager in the first data center (step S20). Further, said other manager receives the result of the retrieval from database servers managed by itself (step S21). When said other manager has received a good result of the retrieval (required data) (step S22), said other manager converts the required data into an appropriate unified data format (step S23).

After that, as shown in the steps S24 and S25 in FIG. 7, said other manager in said other data center sends the data after the conversion as well as its manager information to the manager which has requested the data retrieval.

Further, the manager in the first data center displays the result of the retrieval in the steps S15 and S22 on the input screen of the user's personal computer (steps S17 and S18). Finally, the manager in the first data center compares the date of the manager information of the manager from which the required data has been sent with the date of its manager information, and consequently updates its manager information (step S19).

Said other manager in said other data center, after sending the manager information of the manager from which the required data has been sent to the manager of the request source, also compares the date of the manager information of the manager from which the required data has been sent with the date of its manager information, and consequently updates its manager information (step S26).

Figure 8:
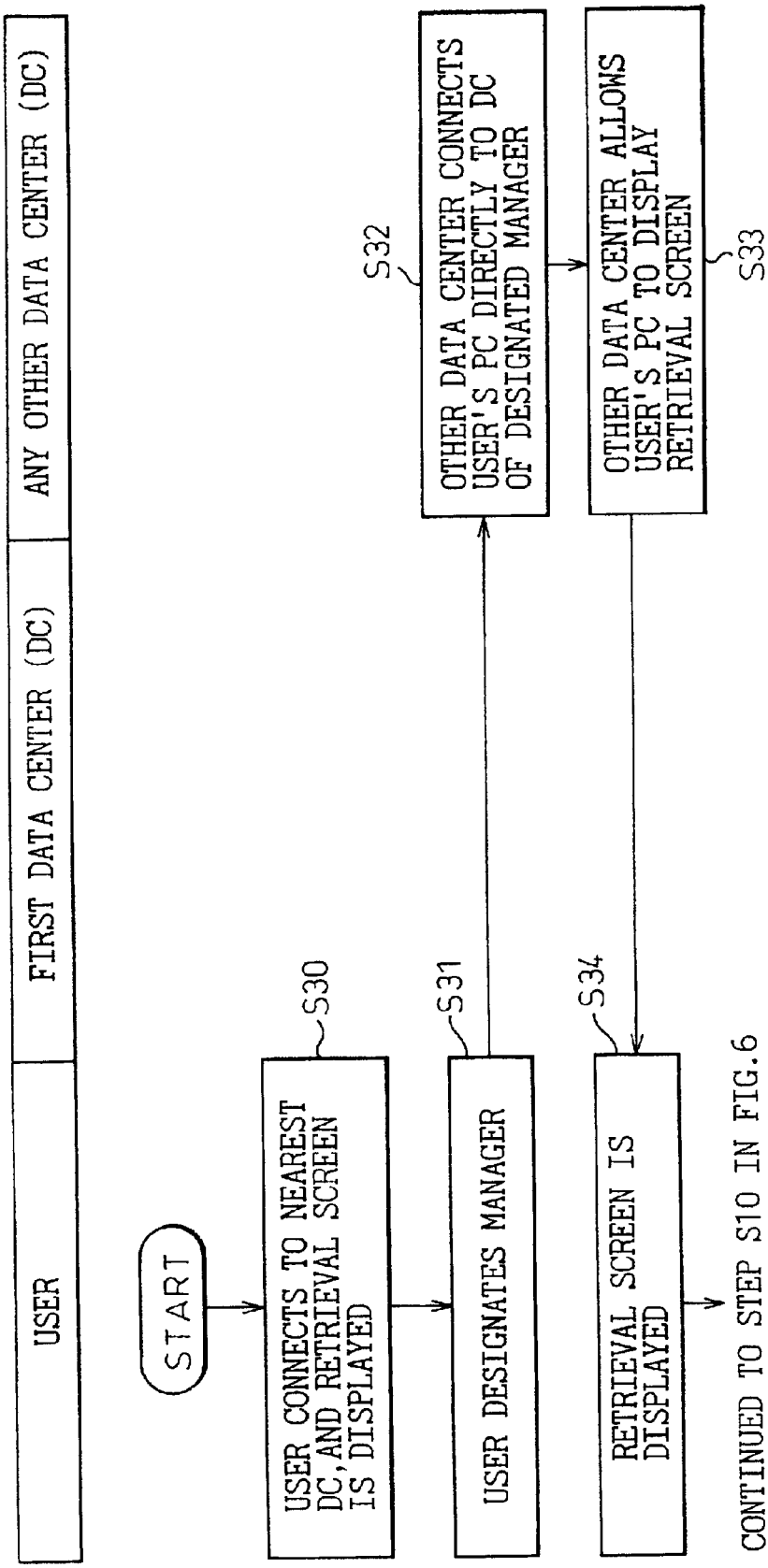
FIG. 8 is a flow chart depicting the procedure of the information retrieval in the case in which a manager is designated in the embodiments of the present invention.

FIG. 8 is a flow chart depicting the procedure of the information retrieval in the case in which a particular manager is designated in the embodiments of the present invention. In FIG. 8, shown is the process flow of the data retrieval in the case in which a particular manager is designated in the information retrieval/distribution system which also comprises a first information retrieval/distribution apparatus consisting of a first data center and other information retrieval/distribution apparatuses each consisting of any other data center.

As shown in the flow chart in FIG. 8, a user at first connects a user's personal computer to the nearest data center (e.g., the first data center), and then allows the personal computer to display the retrieval screen (step S30). Next, the user designates a manager other than the manager in the first data center (step S31).

The data center which includes the manager designated by the user connects the manager in the data center to the user's personal computer (step S32), and then allows the user's personal computer to display the retrieval screen (step S33). Consequently, the retrieval screen in the data center is displayed on the input screen of the user's personal computer (step S34), and then the process goes to the aforementioned step S10 in FIG. 6 and the ordinal data retrieval is executed.

Figure 9:
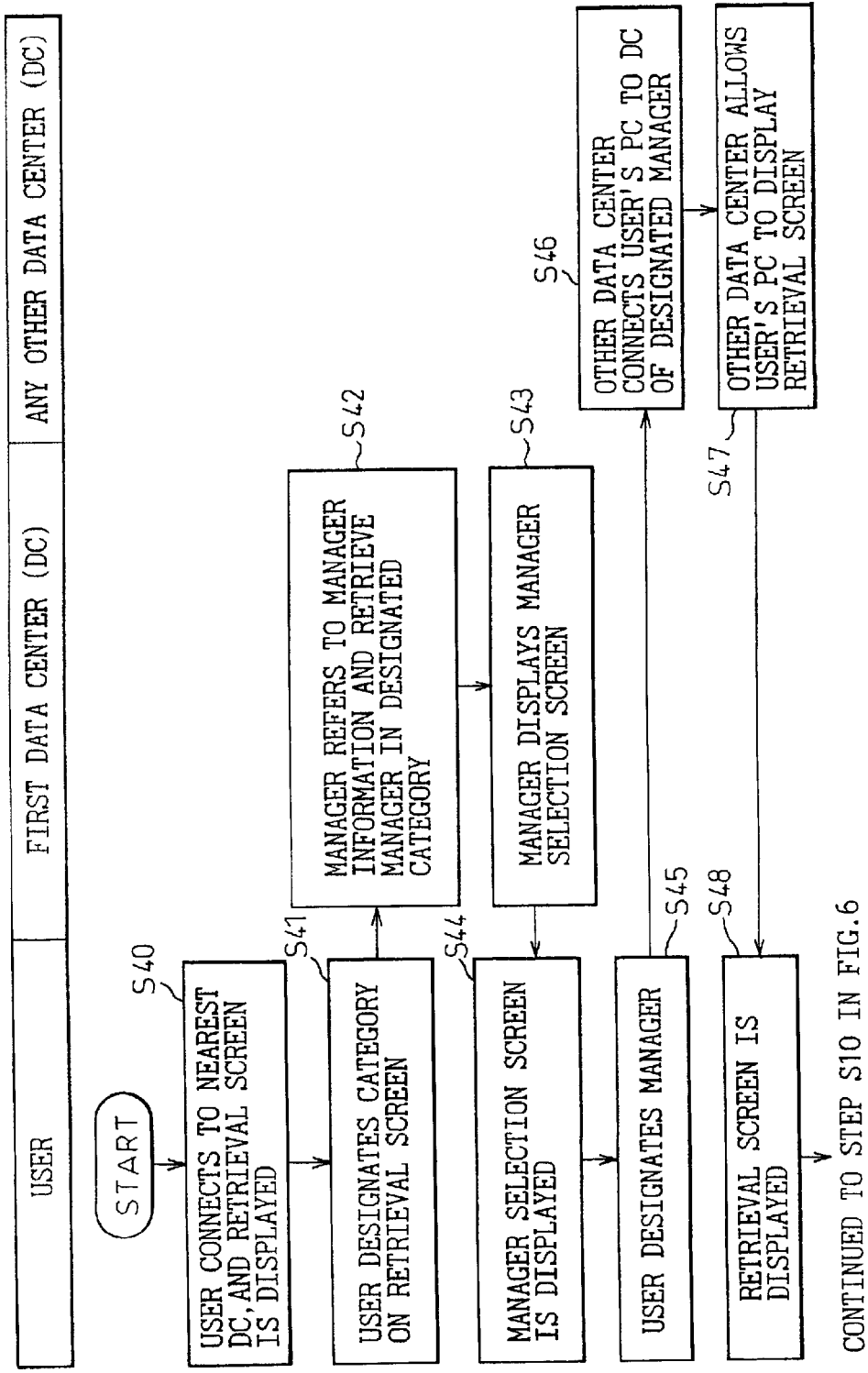
FIG. 9 is a flow chart depicting the procedure of the information retrieval in the case in which a particular category is designated in the embodiments of the present invention.

FIG. 9 is a flow chart depicting the procedure of the information retrieval in the case in which a particular category is designated in the embodiments of the present invention. Also in FIG. 9, shown is the process flow of the data retrieval in the case in which that a particular category is designated in the information retrieval/distribution system which also comprises a first information retrieval/distribution apparatus consisting of a first data center and other information retrieval/distribution apparatuses each consisting of any other data center.

As shown in the flow chart in FIG. 9, a user at first connects a user's personal computer to the nearest data center (e.g., the first data center), and then allows the personal computer to display the retrieval screen (step S40). Next, the user designates a category on this retrieval screen (step S41).

The manager in the first center refers to its manager information and retrieves the managers which manage databases in the designated category (step S42), and then displays the manager selection screen on which managers in this category are described on the input screen of the user's personal computer (steps S43 and S44).

The user designates a manager on the manager selection screen displayed on the input screen (step S45). The data center which includes the manager which has been designated by the user connects the manager in the data center to the user's personal computer (step S46), and then allows the user's personal computer to display the retrieval screen (step S47). Consequently, the retrieval screen in the data center is displayed on the input screen of the user's personal computer (step S48), and then the process goes to the aforementioned step S10 in FIG. 6 and the ordinal data retrieval is executed.

Figure 10:
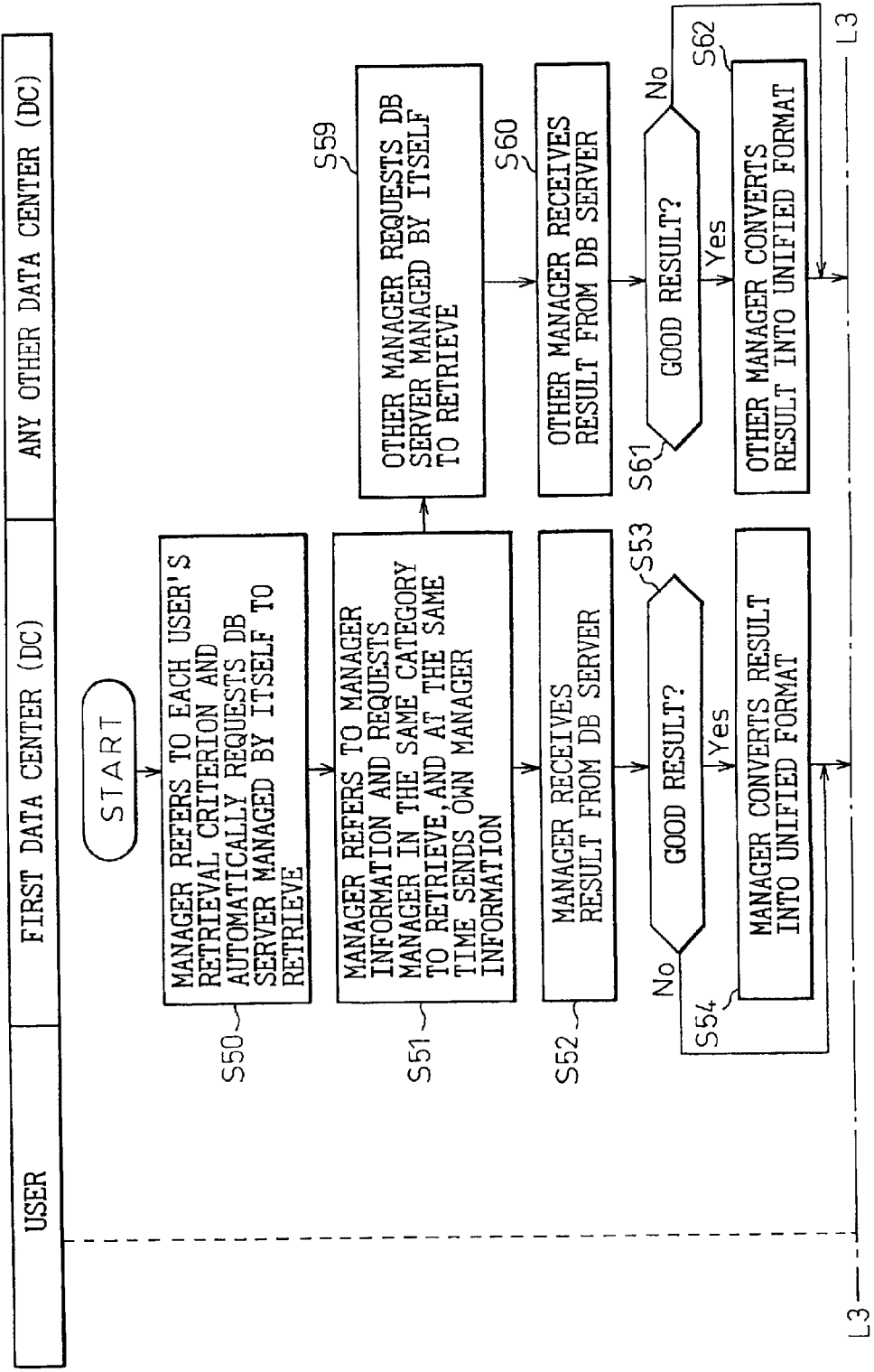
FIG. 10 is a flow chart (1) depicting the procedure of a periodical information retrieval in the embodiments of the present invention.

FIG. 10 and FIG. 11 are flow charts (1) and (2) respectively depicting the procedure of a periodical information retrieval in the embodiments of the present invention. In FIG. 10 and FIG. 11, shown is the process flow in the case of executing the periodical data retrieval in the information retrieval/distribution system which also comprises a first information retrieval/distribution apparatus consisting of a first data center (DC) and other information retrieval/distribution apparatuses each consisting of any other data center (DC).

As shown in the flow chart in FIG. 10, the manager in the first data center at first refers to each user's retrieval criterion, and automatically requests the database servers managed by itself to retrieve the data (step S50). Next, the manager in the first data center also requests any other manager (other manager) in any other data center (other data center) which manage the databases having the data in the same category as the required data to retrieve the required data, and at the same time sends its manager information to said other manager in said other data center (step S51). Further, the manager in said first data center receives the result of retrieval from the database server managed by itself (step S52). When the manager in the first data center has received a good result of the retrieval (the required data) (step S53), the manager converts the required data into an appropriate unified data format (step S54).

On the other hand, said other manager in said other data center, which manages the database having the data in the same category as the required data, requests the database servers managed by itself to retrieve the required data according to the request of data retrieval from the manager in the first data center (step S59). Further, said other manager in said othe data center receives the result of the retrieval from the database server managed by itself (step S60). When said other manager in said other data center has received a good result of the retrieval (the required data) (step S61), said other manager converts the required data into an appropriate unified data format (step S62).

After that, as shown in the steps S63 and S64 in FIG. 11, said other manager in said other data center sends the data after the conversion, as well as its manager information, to the manager which has requested the data retrieval.

The manager in the first data center stores the result of the retrieval in steps S53 and S61 in the file (step S55). Further, the manager in the first data center compares the date of the manager information of the manager from which the required data has been sent with the date of its manager information, and consequently updates its manager information (step S56). Finally, the manager in the first data center sends the notification that the periodical data retrieval has completed to the user by e-mail (step S57). The user may obtain the file which has been indicated in this e-mail (step S58).

Said other manager in said other data center, after sending the manager information of the manager from which the required data has been sent, also compares the date of the manager information of the manager from which the required data has been sent with the date of its manager information, and consequently updates its manager information (step S65).

As described above, according to the preferred embodiments of the present invention, users may only request a database management unit such as a manager to retrieve the information necessary for the users, so that the database management unit requests the remote database management units to retrieve the necessary information, and collects the necessary information, and then distributes the necessary data to the user. Therefore, the present invention has the advantageous effect in that it is not necessary for the user to check on the information about the location of the data every time the user wants to get the data.

In addition, according to the preferred embodiments of the present invention, the database management unit has the function of converting the information from the database to a unified data format. Therefore, the present invention has the advantageous effect in that it is not necessary for the user to convert the format of the distributed data every time the user get it.

Furthermore, according to the preferred embodiments of the present invention, since a single database management unit exchanges periodically the management information with the database management unit managing the database related to the required information, even if a new database has been added, the location of the data base may be found automatically. Therefore, the present invention has the advantageous effect that it is not necessary for a user to look for the location of the new database every time the user want to get some information.

Furthermore, according to the preferred embodiments of the present invention, it becomes possible to obtain constant and periodical data, or it becomes possible to obtain data at data renewal, by registering user's mail addresses and data obtaining schedules as management information, and thereby automatic data collection may be executed without missing data.

What is claimed is:

1. An information retrieval/distribution system, comprising:

an information retrieval request unit requesting the retrieval of several kinds of information that are scattered on a network; and a plurality of database management units managing databases in which said several kinds of information are stored, wherein each of said plurality of database management units has management information about the databases that are managed by each database management unit, and has management information about the databases that are managed by other database management units that can be connected to said each database management unit through said network, and wherein when a retrieval criterion is input to said information retrieval request unit, one of said plurality of database management units, based on said management information in one database management unit, retrieves the information in the databases managed by said one database management unit, and requests any other database management unit managing the database in which the information related to said retrieval criterion is stored, to retrieve the information in the databases managed by said other database management unit, thereby distributing the information corresponding to said retrieval criterion to an information retrieval request source, wherein said one database management unit manages a plurality of databases and registers kinds of said plurality of databases as management information and, when the information retrieval is requested by said information retrieval request source, said one database management unit retrieves said plurality of databases to collect the required information, and then converts the data format of the collected information into a unified format and distributes the collected information to said information retrieval request source.

2. The information retrieval/distribution system as set forth in claim 1, wherein said one database management unit requests said other database management unit to retrieve the information in the databases managed by said other database management unit followed by receiving the result of the retrieval of said information from said other database management unit to distribute said result to said information retrieval request source.

3. The information retrieval/distribution system as set forth in claim 1, wherein said one database management unit includes the list of the management information possessed by said other database management unit in the management information of said one database management unit, comparing the management information of the database management unit that has been newly requested to retrieve the required information by said one database management unit with the management information of said one database management unit to obtain the difference between said both management information, and updating the management information of said one database management unit, based on said difference or communicates with said other database management unit periodically and exchanging the management information with said other database management unit to update the management information of said one database management unit.

4. The information retrieval/distribution system as set forth in claim 1, wherein said one database management unit makes category information that defines the categories of the databases managed by said one database management unit, and designates a database management unit managing the database in the same category to exchange the information with said database management unit, based on said category information.

5. The information retrieval/distribution system as set forth in claim 1, wherein said one database management unit designates retrieving items of the information in the databases managed by said one database management unit through a retrieving screen of said information retrieval request unit, and requests said other database management unit to retrieve the information in the databases managed by said other database management unit.

6. The information retrieval/distribution system as set forth in claim 1, wherein said one database management unit requests automatically said other database management unit managing the database in which the information related to said retrieval criterion is stored, to retrieve said information, in the case in which said one database management unit does not designate any retrieving item through a retrieving screen of said information retrieval request unit.

7. The information retrieval/distribution system as set forth in claim 1, wherein said one database management unit designates a category through a retrieving screen of said information retrieval request unit, and connects said one database management unit automatically to said other database management unit managing the database in said category to select said database in said category.

8. The information retrieval/distribution system as set forth in claim 1, wherein said one database management unit registers the retrieval information of said information retrieval request source, executes the same retrieval periodically, based on said retrieval information, and sends the result of the retrieval to said information retrieval request source.

9. A computer-readable storage medium storing a program for controlling a computer to retrieve/distribute, by, retrieving information in databases managed by one of a plurality of database management units, based on the management information in one database management unit, when a retrieval criterion is input to an information retrieval request unit requesting the retrieval of several kinds of information which are scattered on a network; and requesting any other database management unit that is able to be connected to said one database management unit through said network, to retrieve information in a database in which information related to said retrieval criterion is stored and that is managed by said other database management unit, based on the management information about the databases managed by said other database management unit, registering kinds of said plurality of databases as management information by the one of the plurality of database management units:

retrieving said plurality of databases to collect the required information when the information retrieval is requested by an information retrieval request source by the one of the plurality of database management units;

converting the data format of the collected information into a unified format by the one of the plurality of database management units; and distributing the collected information to said information retrieval request source by the one of the plurality of database management units.

10. A method for information retrieval/distribution to retrieve information and distribute said information to a information retrieval request source, comprising:

retrieving the information in a plurality of databases managed by one of a plurality of database management units, based on the management information in one database management unit, when a retrieval criterion is input to an information retrieval request unit requesting the retrieval of several kinds of information that are scattered on a network;

requesting any other database management unit that can be connected to said one database management unit, through said network, to retrieve the information in the database in which the information related to said retrieval criterion is stored and which is managed by said other database management unit, based on the management information about the databases which are managed by said other database management unit, registering kinds of said plurality of databases as management information by the one of a plurality of database management units;

retrieving said plurality of databases to collect the required information when the information retrieval is requested by said information retrieval request source by the one of a plurality of database management units;

converting the data format of the collected information into a unified format by the one of a plurality of database manaaement units; and distributing the collected information to said information retrieval request source by the one of a plurality of database management units.

11. The method according to claim 10, further comprising requesting said other database management unit to retrieve the information in the databases managed by said other database management unit followed by receiving the result of the retrieval of said information from said other database management unit to distribute said result to said information retrieval request source by said one database management unit.

12. The method according to claim 10, further comprising:

including the list of the management information possessed by said other database management unit in the management information of said one database management unit by the one manager;

comparing the management information of the database management unit that has been newly requested to retrieve the required information by said one database management unit with the management information of said one database management unit to obtain the difference between said both management information by the one manager;

updating the management information of said one database management unit, based on said difference or communicates with said other database management unit periodically, by the one manager; and exchanging the management information with said other database management unit each other to update the management information of said one database management unit by the one manager.

13. The method according to claim 10, further comprising:

making category information that defines the categories of the databases managed by said one database management unit by the one database management unit; and designating a database management unit managing the database in the same category to exchange the information with said database management unit, based on said category information by the one database management unit.

14. The method according to claim 10, further comprising:

designating retrieving items of the information in the databases managed by said one database management unit through the retrieving screen of said information retrieval request unit said one database management unit said one database management unit;

requesting said other database management unit to retrieve the information in the databases managed by said other database management unit by said one database management unit.

15. The method according to claim 10, further comprising requesting automatically said other database management unit managing the database in which the information related to said retrieval criterion is stored, to retrieve said information, in the case in which said one database management unit does not designate any retrieving item through the retrieving screen of said information retrieval request unit by said one database management unit.

16. The method according to claim 10, further comprising:

designating a category through the retrieving screen of said information retrieval request unit by said one database management unit; and connecting said one database management unit automatically to said other database management unit managing the database in said category to select said database in said category by said one database management unit.

17. The method according to claim 10, further comprising:

registering the retrieval information of said information retrieval request source by said one database management unit;

executing the same retrieval periodically, based on said retrieval information by said one database management unit; and sending the result of the retrieval to said information retrieval request source by said one database management unit.

18. An information retrieval/distribution systems, comprising:

a plurality of databases; and a plurality of database management units managing databases in which said several kinds of information are stored, wherein one database management unit of a plurality of database management units managing a plurality of databases and registering kinds of said plurality of databases as management information and, when information retrieval is requested by an information retrieval request source, said one database management unit retrieves said plurality of databases to collect the required information, and then converts the data format of the collected information into a unified format and distributes the collected information to said information retrieval request source.

* * * * *

UNITED STATES PATENT AND TRADEMARK OFFICE
CERTIFICATE OF CORRECTION

PATENT NO. : 6,853,995 B2
DATED : February 8, 2005
INVENTOR(S) : Yoshiaki Matsuzaki et al.

It is certified that error appears in the above-identified patent and that said Letters Patent is hereby corrected as shown below:

Column 14,
Line 42, delete "medium".
Line 45, delete "the".

Column 15,
Line 5, change "a" to -- an --.
Line 31, change "manaaement" to -- management --.

Signed and Sealed this

Thirtieth Day of August, 2005

JON W. DUDAS
*Director of the United States Patent and Trademark Office*